United States Patent [19]

Burney

[11] Patent Number: 4,746,826
[45] Date of Patent: May 24, 1988

[54] ELECTROMAGNETIC CLUTCH APPARATUS

[75] Inventor: Charles F. Burney, Orland, Calif.

[73] Assignee: A.R.A. Manufacturing Company of Delaware, Inc., Grand Prairie, Tex.

[21] Appl. No.: 78,080

[22] Filed: Jul. 27, 1987

[51] Int. Cl.$^4$ .......................... H02K 7/10; F16H 3/44
[52] U.S. Cl. ......................................... 310/78; 74/789
[58] Field of Search .................... 192/20, 48.2, 56 R, 192/67 R, 90; 310/78, 83; 74/789

[56] References Cited

U.S. PATENT DOCUMENTS 4,437,355  3/1984  Bordat .................. 74/385
4,656,407  4/1987  Burney ................. 180/178

Primary Examiner—Patrick R. Salce
Assistant Examiner—Judson H. Jones
Attorney, Agent, or Firm—Cox & Smith Inc.

[57] ABSTRACT

An electromagnetic clutch apparatus for providing a reversible mechanical linkage between a driving motor and its mechanical load and which is particularly well suited for use as part of an electrically actuatable automotive cruise control system. The apparatus is inherently self-disengaging, thereby limiting the maximum mechanical load against which the driving motor may operate. The apparatus is designed to be placed between the final output gear of a gear train and the engine throttle and yet overcomes the problems associated with such a placement because the mechanical torque which the clutch is designed to transmit is not directly related to the electromagnetic force required to keep the clutch engaged.

7 Claims, 2 Drawing Sheets

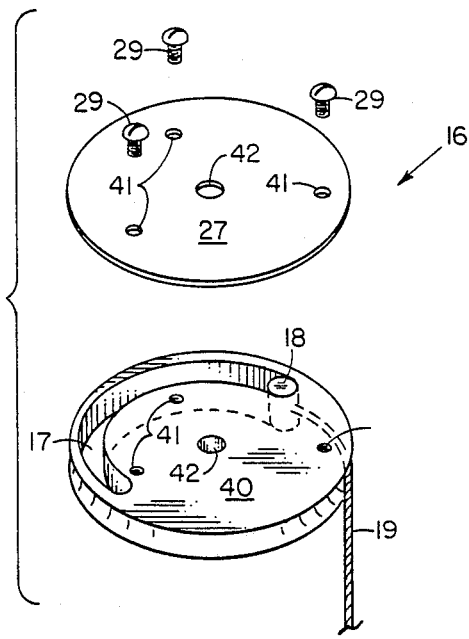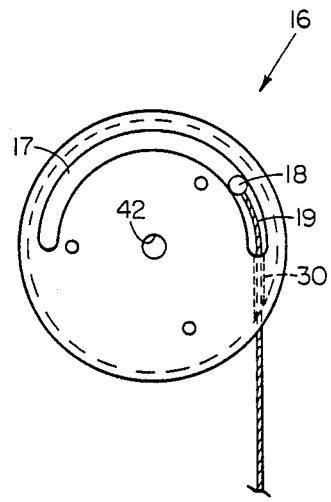
FIG. 3  FIG. 4
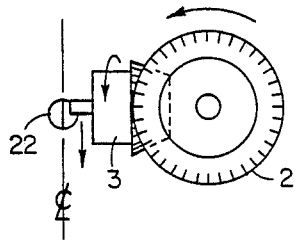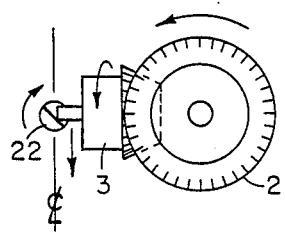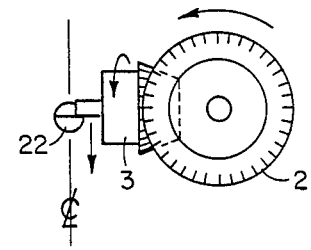
FIG. 5A  FIG. 5B  FIG. 5C

ELECTROMAGNETIC CLUTCH APPARATUS

BACKGROUND OF THE INVENTION

The present invention relates to a clutch apparatus for providing a reversible mechanical linkage between a driving motor and its mechanical load. The invention was conceived for use as part of an electric actuator in an automotive cruise control apparatus but may be useful in other applications as well.

In an automotive cruise control system which makes use of an electric actuator, such as is disclosed in U.S. Pat. No. 4,656,407, it is necessary to have a clutch mechanism which mechanically links the electric servo motor to the element which modifies the speed of the vehicle's engine. A clutch is necessary in order to limit the mechanical load against which the electric motor operates and prevent damage to the motor due to excessive current. It is further desirable in such a system for the clutch to engage or disengage upon electrical actuation so that the clutch may be incorporated into the overall control loop. A well known method for achieving this latter objective is to use electromagnetic force to engage the clutch.

In the prior art, there are found two principal designs for electromagnetic clutches. One is the friction type such as is found in the drive trains of common automobiles where torque is transmitted from one rotating plate to another by the friction existing between the two plates. In an electromagnetic friction type clutch, the plates are engaged with one another by the use of electromagnetic force rather than the use of springs as in automotive drive trains. The second type of electromagnetic clutch is the positive engagement type which uses electromagnetic force to maintain the engagement of gears, pins, or other interlocking devices. Both of these two devices can be designed to limit the torque against which the driving motor must turn by limiting the electromagnetic force which holds the clutch in engagement. When the force applied to the clutch exceeds this electromagnetic holding force, a positive engagement type clutch will disengage while a friction type clutch will slip. Both of these designs can therefore be said to be self-disengaging.

As aforesaid, it is necessary for a clutch which is part of an electrical automotive cruise control system to be self-disengaging both to prevent damage to the electric driving motor and to prevent hazardous overheating of the motor. This means, in the case of either of the two prior art devices described above, that the electromagnetic holding force must be at least as great as the maximum force which the actuation system is designed to operate against in moving the vehicle's throttle element. This maximum force is primarily determined by the throttle spring of the carburetor which the actuator must pull against in modifying the engine speed of common automobiles. Since it is not uncommon for such throttle springs to require a force in excess of twenty pounds to extend the spring, the clutch must be capable of transmitting this amount of force to the throttle. This presents a number of design problems in utilizing an electromagnetic clutch. First, since the electromagnetic holding force must be at least as great as the maximum operating force (greater in case of a friction type clutch), relatively large amounts of electrical power will be needed. The required clutch will also be physically large and will generate considerable amounts of heat. All of these factors will tend to increase the total cost of the system.

One way of overcoming the problems associated with operating against a relatively large mechanical load is to take advantage of the reduction in torque by the gear train between the driving motor and the engine throttle. Electric cruise control systems normally make use of such gear trains in order to limit the size of the required electric driving motor. By interposing the clutch between the driving motor and the first driven gear, the clutch must only operate against the same maximum torque which the driving motor is designed to operate against because of the mechanical advantage produced by the gear train. In automotive cruise control systems, however, it is not desirable to locate the clutch anywhere but between the throttle and the final driven gear of the gear train. This is because it is possible for the gear train to become jammed due to a damaged gear or the presence of foreign material. If the clutch is located upstream of the damaged gear, disengagement of the clutch will not effect a release of the throttle. For obvious safety reasons, it is desirable for disengagement of the clutch to always effect a return of the throttle to manual control.

Accordingly, it can be seen that there is a need for apparatus to overcome the problems enumerated above relating to automotive cruise control systems. It is toward these objectives that the present invention is directed.

SUMMARY OF THE INVENTION

The present invention discloses an electromagnetic clutch apparatus designed to overcome the particular problems associated with electrically actuable cruise control systems for automobiles. The apparatus is inherently self-disengaging thereby limiting the maximum mechanical load which the driving motor may operate against. It is designed to be placed between the final output gear of a gear train and the engine throttle and yet overcomes the problems associated with such a placement because the mechanical torque which the clutch is designed to transmit is not directly related to the electromagnetic force required to keep the clutch is engagement.

The preferred embodiment of the present invention utilizes a differential gear cluster to transmit torque between a driving shaft and a driven shaft. A typical differential gear arrangement comprises two gears, a driven bevel gear and a driving bevel gear, rotating about and supported by the same shaft and having teeth facing one another. Interposed between these two gears are two satellite gears, each engaging both the driven bevel gear and driving bevel gear. Each satellite gear rotates about a shaft which is connected to a gear hub which rotates about the same shaft which supports the driven and driving bevel gears. The two shafts supporting the satellite gears are oriented so that the two satellite gears rotate about a common axis.

A number of different mechanical movements can result from a differential gear arrangement, however, this discussion will focus on those relevant to the operation of a differential gear as a clutch. In particular, it should be appreciated that if the gear hub, to which the shafts supporting the two satellite are mounted, is free to rotate about the shaft supporting the driving and driven bevel gears, the driving bevel gear may be rotated without imparting any torque to the driven gear. This is because the two satellite gears will be made to rotate in directions tending to cause the rotation of the gear hub about its shaft. If the torque required to turn the driven gear is greater than the torque needed to rotate each satellite gear and rotate the hub, each satellite gear will rotate around the circumference of the driven gear as their respective teeth engage, and no torque will be imparted to the driven gear. If, however, the gear hub is prevented from rotating, each satellite gear will remain stationary and directly transmit torque from the driving bevel gear to the driven bevel gear, causing the latter gear to turn in a direction opposite to that of the former gear. It is this aspect of a differential gear arrangement, that of reversibly enabling and disabling torque transmission, which makes it suitable for use as a clutch.

Thus, the differential gear clutch, as described above, can be disengaged or engaged according to whether the hub is either free to rotate or not, respectively. The present invention makes use of further novel means to simultaneously effect electrical actuation of clutch engagement and produce a self-disengaging aspect to the clutch which limits the torque it can transmit. A mechanical stop is utilized to prevent rotation of the gear hub by contacting, and preventing the further movement of, the end of one of the shafts about which the satellite gears rotate. This mechanical stop is further connected to, or is part of, a rotatable engagement shaft oriented perpendicularly to the plane of rotation of the hub. The mechanical stop is connected to, or is a part of, the engagement shaft in such a manner so as to function as a lever which imparts torque to the engagement shaft when the end of either of the shafts about which the satellite gears rotate imparts a force to the mechanical stop. The engagement shaft which includes the mechanical stop is further connected by a cable to a solenoid in such a manner that energization of the solenoid rotates the engagement shaft about its axis, as the solenoid element moves, to a position which enables the mechanical stop to prevent further rotation of the gear hub. When the mechanical stop engages one of the ends of the shafts about which the satellite gears rotate, the stop functions as a lever which imparts a torque to the engagement shift to which it is connected to, or is a part of, which tends to rotate the engagement shaft in a direction opposite to that produced by the solenoid. When this torque produces a force in the cable connected to the solenoid element which is greater than its electromagnetic holding force, the solenoid element is pulled away from its energized position, and the mechanical stop rotates to a position allowing rotation of the gear hub. A self-disengagement feature is thereby produced.

The driven gear is further connected to a pulley arrangement which causes movement of the engine throttle element in correspondence with rotation of the driven gear. The clutch apparatus disclosed by the present invention thus transmits torque from the driving motor to the pulley arrangement which then operates the throttle. The clutch is engaged electrically by energizing the solenoid. The clutch is inherently self-disengaging since it will disengage when the force on the solenoid becomes great enough to pull the solenoid element from its energized position. In this way, a maximum torque load which the driving motor is allowed to operate against is specified, varying in direct proportion to the electromagnetic holding force of the solenoid. The proportionality constant, by which the maximum torque load and maximum electromagnetic holding force are related, may itself be varied, however, by adjusting the mechanical advantage of the lever action existing between the shafts connected to the gear hub and the engagement shaft connected to the solenoid. The torque imparted to the engagement shaft by any given amount of torque generated by the driving motor also varies inversely with the length of the shaft which rotates with the gear hub and contacts the engagement shaft.

Owing to the variable relationship which exists between the maximum allowable torque and the maximum electromagnetic holding force of the solenoid, the disclosed apparatus allows use of a much smaller and less powerful electromagnetic holding device than any apparatus found in the prior art. Furthermore, this advantage is obtained without comprising the clutch's optimum position at the final output gear of the gear train.

Additional advantages, aspects, and objects of the present invention will become apparent to one of ordinary skill in the art from the following description of the preferred embodiment as well as from the appended claims.

BRIEF DESCRIPTION OF THE DRAWINGS

FIG. 3 is an exploded view of the retract pulley which is driven by the clutch apparatus to effect changes in the speed of the automobile's engine.

FIG. 4 is a plane view of the retract pulley.

FIG. 5 is an end-on view of the engagement shaft contacting the end of one of the satellite gear shafts showing three different positions of the engagement shaft labeled A, B, and C.

DETAILED DESCRIPTION OF THE PREFERRED EMBODIMENT

Figure 1:
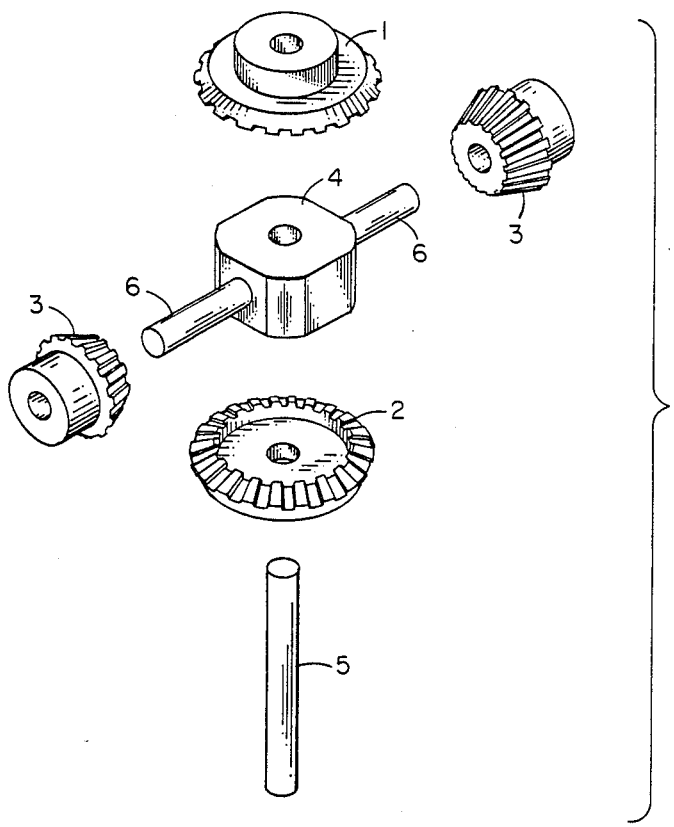
FIG. 1 is an exploded view of the differential gear cluster made a part of the present invention.

Referring to FIG. 1, there is shown the differential gear cluster used in the preferred embodiment of the present invention. The differential gear cluster is shown in an exploded view so that its component parts may be better seen. Driving bevel gear 2 and driven bevel gear 1 are both rotatably mounted on shaft 5. Also rotatably mounted on shaft 5, and positioned between driving bevel gear 2 and driven bevel gear 1, is gear hub 4. Attached to opposite sides of gear hub 4, and oriented perpendicularly to shaft 5, are satellite gear shafts 6. Rotatably mounted on each satellite gear shaft 6 is a satellite gear 3. When the unit is assembled, both satellite gears have their teeth meshing with both driven bevel gear 1 and driving bevel gear 2.

For the purposes of the present invention, the relevant characteristic of this gear arrangement is that if gear hub 4 is free to rotate about shaft 5, driving gear 2 may be rotated without causing driven bevel gear 1 to rotate. This is because the satellite gears 3 are then free to roll around the circumference of driven bevel gear 1 as they are rotated about satellite gear shafts 6 due to the rotation of driving bevel gear 2. That driven bevel gear 1 will not be rotated in this case, assumes, of course, that the torque needed to rotate driven gear 1 is greater than that the total amount of torque applied by the teeth of driving gear 2 to satellite gears 3 which is needed to cause rotation of satellite gears 3 and rotation of gear hub 4. As will be apparent later in this description, the differential gear cluster is attached to the rest of the component parts of the preferred embodiment in such a manner that this will always be the case as long as gear hub 4 is otherwise free to rotate.

On the other hand, if gear hub 4 is prevented from rotating as driving gear 2 rotates, satellite gears 3 will rotate but cannot undergo translatory motion. This means that the torque produced by rotating driving gear 2 will be transmitted directly to driven gear 1 causing driven gear 1 to rotate in a direction opposite to driving gear 2.

Figure 2:
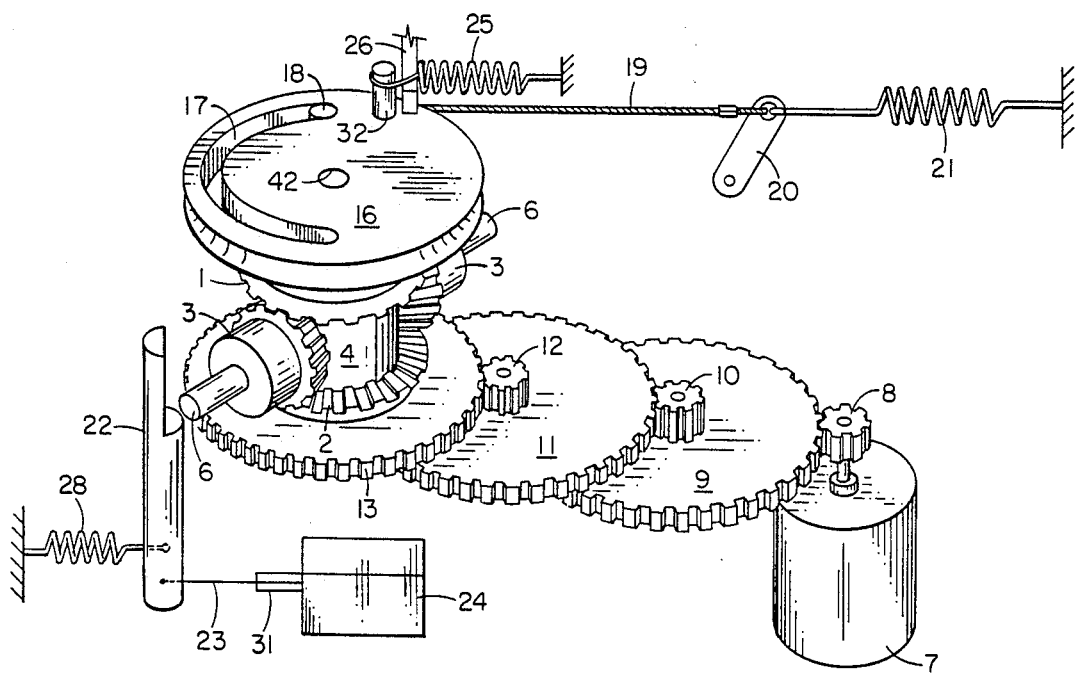
FIG. 2 is a three dimensional perspective drawing of the entire clutch mechanism along with the relevant components of an automotive speed control apparatus of which it is a part.

Referring now to FIG. 2, there is shown a depiction of the preferred embodiment of the present invention as part of an electrical actuation apparatus for controlling the speed of an automobile. The apparatus is designed so that actuation of driving motor 7 will cause the automobile engine to either speed up or slow down according to the direction which driving motor 7 is made to turn. The rotating shaft of driving motor 7 is non-rotatably connected to spur gear 8. When spur gear 8 is then made to rotate by the rotating shaft of driving motor 7, spur gear 8 drives a gear train comprising gears 9, 10, 11, 12, and 13. Gear 13 is the final output gear of the drive train and is non-rotatably connected to driving bevel gear 2 of the differential gear cluster. Gear 13 rotates about either shaft 5 or another shaft having the same longitudinal axis as shaft 5. As described above, the rotation of driving bevel gear 2 will cause the rotation of gear hub 4 about shaft 5. As will be described more fully below, however, engagement shaft 22 can be positioned to physically engage one of the ends of satellite gear shafts 6, thus preventing the further rotation of gear hub 4 with which satellite gear shafts 6 are connected. If gear hub 4 is now prevented from rotating, rotation of driving gear 2 causes rotation of driven bevel gear 1. Driven bevel gear 1 is non-rotatably connected to retract pulley 16 causing retract pulley 16 to rotate in correspondence with driven bevel gear 1.

Throttle 20 of the vehicle's engine is shown in FIG. 2 as being in the idle position and maintained there by throttle return spring 21. Throttle 20 pivots about shaft 33 and in so doing changes the speed of the vehicle's engine. Cable 19 is also attached to throttle 20 at the same point as throttle return spring 21. When the tension in cable 19 exceeds the force exerted by throttle return spring 21, throttle 20 will pivot about shaft 33 toward cable 19 and thereby increase the speed of the engine. Actuator return spring 25 has one of its ends attached to an unspecified immovable structure and the other end attached to pole piece 32 of retract pulley 16. If no other torques are acting upon retract pulley 16, actuator return spring 25 maintains retract pulley 16 in a position defined by the contacting of pole piece 32 with mechanical stop 26. Mechanical stop 26 is an immovable structural component of the apparatus. When driven bevel gear 1 experiences a torque greater than the torque acting on retract pulley 16 due to actuator return spring 25, retract pulley 16 begins to rotate in a direction which increases the tension in cable 19. Cable 19 is connected to retract pulley 16 by means of retaining lug 18. Retaining lug 18 is attached to cable 19 and is slideably engaged in semicircular slot 17 of retract pulley 16.

If retaining lug 18 has slid to the end of semicircular slot 17 nearest pole piece 32, rotation of retract pulley 16 away from mechanical stop 26 will create tension in cable 19. Driving motor 7 is designed to produce a tension greater than the forces exerted by actuator return spring 25 and throttle return spring 21 which tension therefore causes throttle 20 to pivot away from the idle position when driving motor 7 turns in the appropriate direction. When the clutch apparatus is disengaged, actuator return spring 25 serves to return retract pulley 16 to the position where pole piece 32 contacts mechanical stop 26. The torque exerted by actuator return spring 25 on retract pulley 16 in this position also ensures that when the clutch is disengaged, rotation of driving bevel gear 2 produces no rotation of driven bevel gear 1. Throttle return spring 21 then serves to maintain throttle 20 in the idle position unless the throttle is pivoted manually by a means not shown.

Retract pulley 16 is designed so that if throttle 20 is manually pivoted away from the idle position, thereby moving cable 19 toward retract pulley 16, retaining lug 18 will slide in the semicircular slot 17. As shown in FIG. 4, cable 19 passes through aperture 30 as retaining lug 18 slides in semicircular slot 17. Cable 19 is designed to be of sufficient rigidity that, when throttle 20 is manually moved from the idle position, cable 20 can push retaining lug 28 through semicircular slot 17. In this way, excessive slack in cable 19 which could cause kinking or snagging is avoided. Referring to FIG. 3, retract pulley 16 also has attached to it retaining shield 27 by means of screws 29. Retaining shield 27 ensures that cable 19 is constrained within semicircular slot 17 as it pushes retaining lug 18.

FIG. 5 depicts an end-on view of engagement shaft 22 for three different positions. As shown in FIG. 2, engagement shaft 22 is a cylindrical shaft having an extended portion of semicircular shape. It is the flat surface of this extended portion which engages the distal ends of satellite gear shafts 6 when the clutch is engaged. Position A of FIG. 5 shows the clutch in a disengaged position. Engagement shaft 22 is rotated so that its flat surface is oriented tangentially to the path of rotation of the distal ends of satellite gear shafts 6. In this position, the flat surface of engagement shaft 22 makes no contact with satellite gear shafts 6, thus, enabling their free rotation with gear hub 4. As aforesaid, this means that driving bevel gear 2 transmits no torque to driven bevel gear 1.

Position C of FIG. 5 shows the clutch in an engaged position. In this position, the flat surface of engagement shaft 22 impinges upon the paths of rotation of the distal ends of satellite gear shafts 6. Thus, engagement shaft 22 contacts a distal end of satellite gear shaft 6 and prevents its further travel. This position enables the direct transmission of torque from driving bevel gear 2 to driven bevel gear 1. If driven bevel gear 1 is prevented from rotating due to throttle 20 reaching its limit of travel, driving bevel gear 2 will transmit the same amount of torque to gear hub 6 via the teeth of satellite gears 3. Assuming the directions of rotation shown in Position C of FIG. 5, this results in the distal end of one of satellite gear shafts 6 imparting a downward force, which corresponds to the torque imparted by driving bevel gear 2, to the flat surface of engagement shaft 22. If the lengths of satellite gear shafts 6 are such that their distal ends do not extend quite to the longitudinal axis of engagement shaft 22, this results in a torque tending to rotate engagement shaft 22 in the direction shown in Position B of FIG. 5.

The rotation of engagement shaft 22 by satellite gear shafts 6 is opposed by the electromagnetic holding force exerted by solenoid 24 on its element 31. As depicted in FIG. 2, cable 23 is attached to solenoid element 31 and is also attached to a point on the surface of engagement shaft 22 along a line perpendicular to the longitudinal axis of engagement shaft 22. The length of cable 23 and its point of attachment on the surface of engagement shaft 22 are further specified such that when solenoid 24 is energized, thus pulling element 31 in a direction away from engagement shaft 22, cable 23 is drawn taut and rotates engagement shaft 22 to a position which engages the clutch as depicted by Position C of FIG. 5.

Thus, when driven bevel gear 1 is prevented from rotating, two opposing torques act on engagement shaft 22. When the torque exerted by a distal end of one of the satellite gear shafts 6 exceeds the maximum torque which can be exerted by tension created in cable 23 due to the electromagnetic holding force of solenoid 24, solenoid element 31 is pulled away from its energized position. This allows the rotation of engagement shaft 22 to the clutch disengagement position as shown in Position B of FIG. 5. In this way, the clutch is inherently self-disengaging as the maximum torque which it can transmit is limited by the maximum electromagnetic holding force of solenoid 24. The maximum transmittable torque through the clutch varies in direct proportion to the maximum electromagnetic holding force of solenoid 24. The proportionality constant depends both upon the distance between engagement shaft 22 and shaft 5 and upon the position of the distal end of one of satellite gear shafts 6 as it contacts engagement shaft 22 with respect to the longitudinal axis of engagement shaft 22. It is in this sense that the maximum load the clutch will carry is not directly related to the maximum electromagnetic holding force of solenoid 24.

The clutch is also designed to be in an engaged or disengaged position depending upon the energization state of solenoid 24. When solenoid 24 is energized, the clutch operates as described above. When solenoid 24 is de-energized, however, spring 28 serves to the return engagement shaft 22 to the disengaged position as represented by Position A of FIG. 5. As shown in FIG. 2, spring 28 is attached at one end to an immovable structural component and at the other end to the surface of engagement shaft 22 is such manner as to exert a torque on engagement shaft 22 which tends to rotate it to the disengaged position.

What is claimed is:

1. A clutch apparatus of the positive engagement type for reversibly enabling a mechanical linkage between a driving motor and said motor's mechanical load utilizing a differential gear cluster comprising:
   a driving bevel gear mechanically connected to said driving motor and rotating about a fixed axis means;
   a driven bevel gear mechanically connected to a mechanical load and also rotating about said fixed axis means;
   an interposing gear with teeth meshing with the teeth of both said driving bevel gear and said driven bevel gear and rotating about a rotatable axis means perpendicular to said fixed axis means in such manner as to impart no torque to said driven gear as said interposing gear is made to rotate by said driving gear if said rotatable axis is free to rotate about said fixed axis; and
   a mechanical stop means for reversibly enabling and disabling the free rotation of said rotatable axis means about said fixed axis means thereby reversibly disabling and enabling, respectively, the mechanical linkage between said driving gear and said driven gear.

2. The apparatus of claim 1 wherein said mechanical stop means further comprises a mechanical switch means which limits the force which said mechanical stop means can apply to said rotatable axis means in preventing the rotation of said rotatable axis means about said fixed axis means.

3. The apparatus of claim 2 wherein said mechanical switch means further comprises an electric solenoid means which maintains said mechanical stop means in position to prevent rotation of said rotatable axis means about said fixed axis means until a force is applied by said rotatable axis means to said mechanical stop means which overcomes the maximum electromagnetic holding force of said solenoid means.

4. The apparatus of claim 3 wherein said mechanical switch means further comprises:
   a rotatable engagement shaft oriented perpendicularly to the plane in which said rotatable axis means rotates about said fixed axis means;
   a lever means either attached to, or integrally a part of, said engagement shaft which makes contact with said distal end of said rotatable axis means at a single point in said distal end's path of rotation so as to prevent the further rotation of said rotatable axis means about said fixed axis means while enabling said distal end to apply a torque tending to rotate said engagement shaft abouts its longitudinal axis, and, when said engagement shaft is so rotated, said lever means being positioned and constructed so as not to inhibit the further rotation of said rotatable axis means about said fixed axis means; and
   a cable means attached to said engagement shaft and attached to said solenoid means in such manner that a torque is applied to said engagement shaft by said solenoid means through said cable means which is in an opposite direction to the torque applied to said engagement shaft by said distal end of said rotatable axis means which maintains said lever means in position to prevent rotation of said rotatable axis means about said fixed axis means until the torque applied to said rotatable shaft by said distal end of said rotatable axis means exceeds the maximum torque which can be applied to said rotatable shaft by said solenoid means.

5. An apparatus for actuating the throttle of a motor vehicle as part of, for example, an automatic speed control system, comprising:
   a driving motor;
   the clutch apparatus of claim 1;
   a mechanical pulley mechanically connected to said driven gear;
   a cable means attached to both the throttle of the motor vehicle and said mechanical pulley in such manner that rotation of said mechanical pulley in a direction which retracts said cable means results in motion of the vehicle's throttle in a direction which tends to increase the vehicle's speed;
   a spring means connected to said mechanical pulley at one end and immovably fixed at the other end, oriented so as to cause said mechanical pulley to rotate in a direction which lessens the tension in said cable means attaching said mechanical pulley to the vehicle's throttle; and
   a mechanical stop means which stops the rotation of said mechanical pulley due to the torque produced by said spring means at a point at which the vehicle's throttle is in an appropriate idling position.

6. The apparatus of claim 5 further comprising:

a retaining lug attached to said cable means attaching the vehicle's throttle to said mechanical pulley wherein said retaining lug is slideably engaged in a pathway of said mechanical pulley;

a mechanical stop means which limits the sliding of said retaining lug and enables said mechanical pulley to produce tension in said cable means attached to the vehicle's throttle upon rotation in the appropriate direction;

a pathway, integrally a part of said mechanical pulley, into which said retaining lug is slideably engaged in such manner as to allow said retaining lug to slide in a direction which prevents excessive slack from forming in said cable means upon the motion of said cable means toward said mechanical pulley.

7. An apparatus for actuating the throttle of a motor vehicle as part of, for example, an automatic speed control system, comprising:

a driving motor;

the clutch apparatus of claim 4;

a mechanical pulley mechanically connected to said driven gear;

a cable means attached to both the throttle of the motor vehicle and said mechanical pulley in such manner that rotation of said mechanical pulley in a direction which retracts said cable means results in motion of the vehicle's throttle in a direction which tends to increase the vehicle's speed;

a spring means connected to said mechanical pulley at one end and immovably fixed at the other end, oriented so as to cause said mechanical pulley to rotate in a direction which lessens the tension in said cable means attaching said mechanical pulley to the vehicle's throttle; and a mechanical stop means which stops the rotation of said mechanical pulley due to the torque produced by said spring means at a point at which the vehicle's throttle is in an appropriate idling position.

* * * * *